SAFRANINE B

JANUS BLUE

JANUS GREEN

JANUS GREEN B

JANUS BLACK

ETHYL BLUE

INVENTOR.
RICHARD J. HOVEY
ATTORNEY

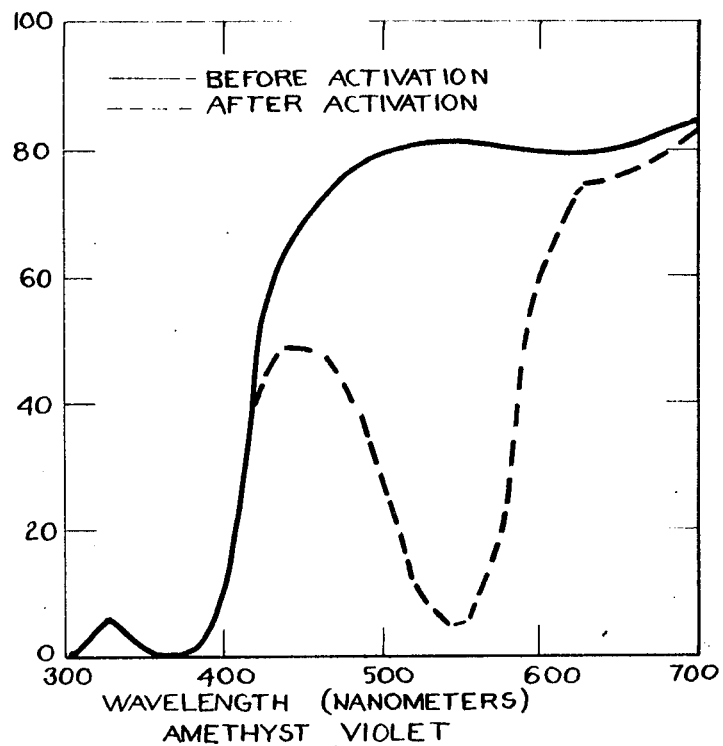
Fig. 9 — AMETHYST VIOLET
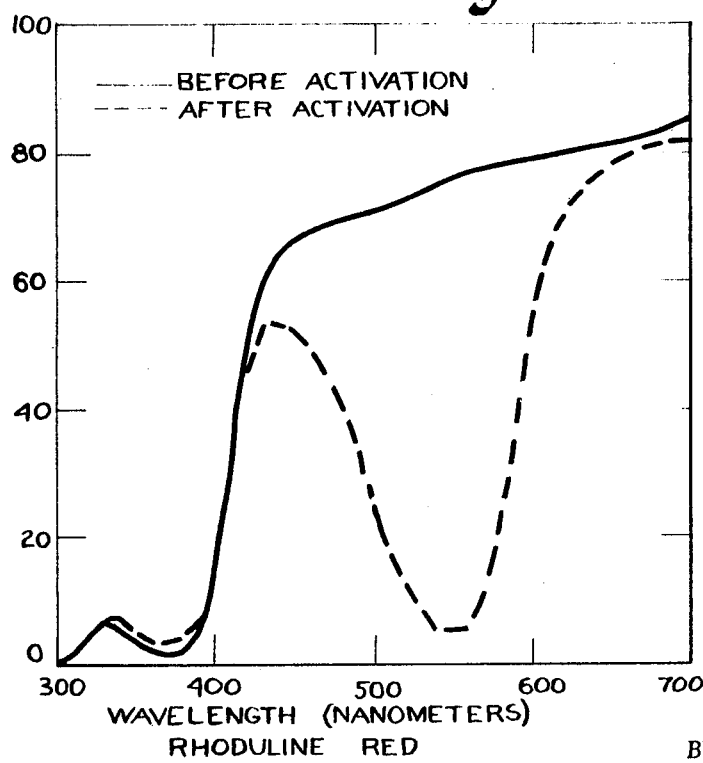
Fig. 10 — RHODULINE RED

WAVELENGTH (NANOMETERS)
NEUTRIAL RED

WAVELENGTH (NANOMETERS)
PINAKRYPTOL GREEN

United States Patent Office 3,660,299
Patented May 2, 1972

3,660,299
VARIABLE DENSITY LIGHT FILTERING MEANS UTILIZING LEUCO PHENAZINE DYES
Richard J. Hovey, Sturbridge, Mass., assignor to American Optical Corporation, Southbridge, Mass.
Filed Apr. 10, 1969, Ser. No. 814,955
The portion of the term of the patent subsequent to Oct. 29, 1985, has been disclaimed
Int. Cl. G02b 5/24
U.S. Cl. 252—300  2 Claims

ABSTRACT OF THE DISCLOSURE

A light filter of variable optical density includes a body of solution of a leuco phenazine dye and a reversible reducing agent, and exposure of the body to ultraviolet light colorizes the leuco dye automatically varying the optical density of the body proportionally to the amount of ultraviolet light incident on the body.

---

Figure 1:
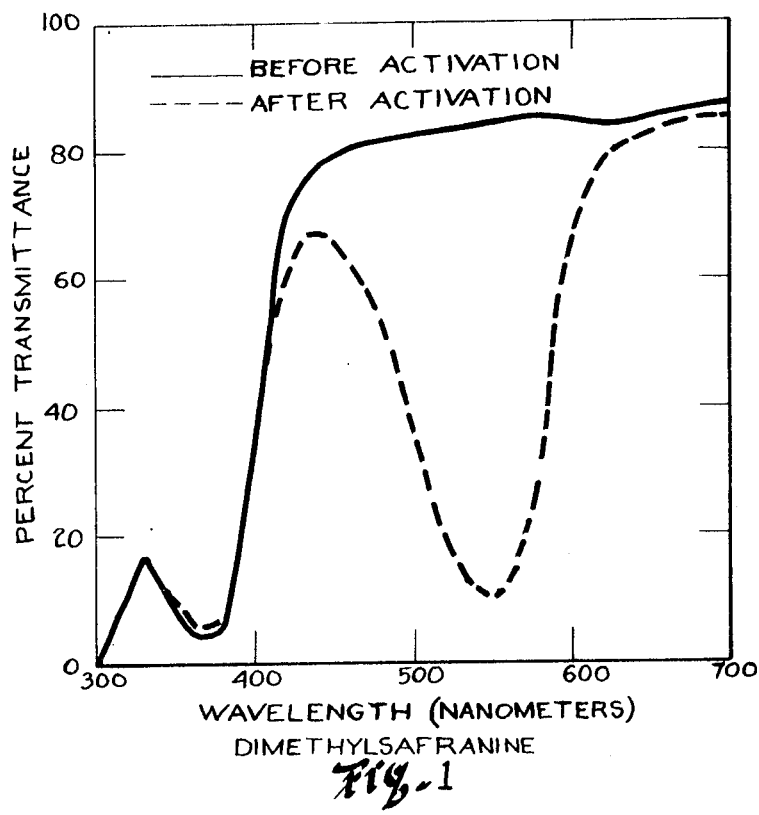
Figure 2:
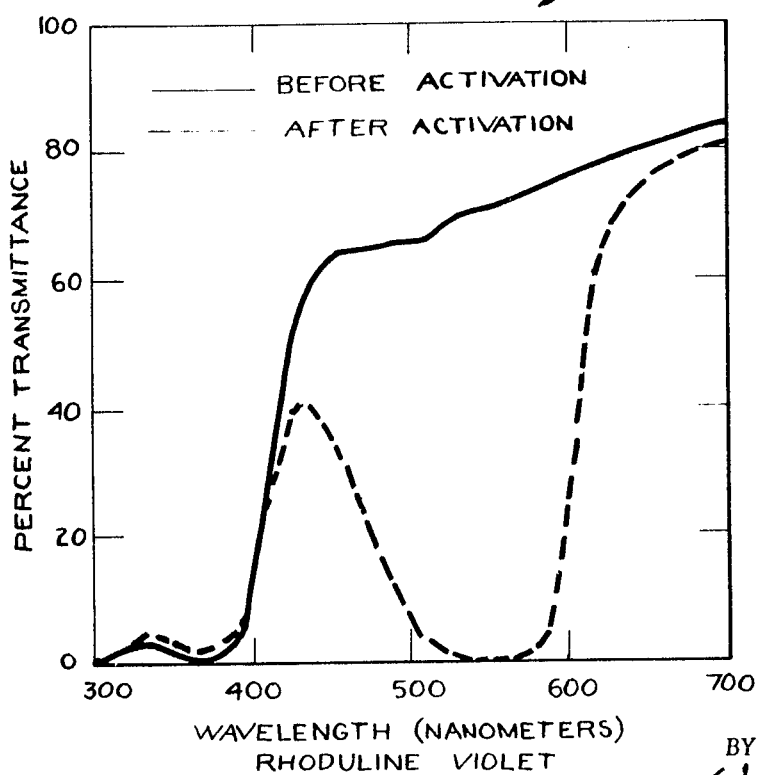
Figure 3:
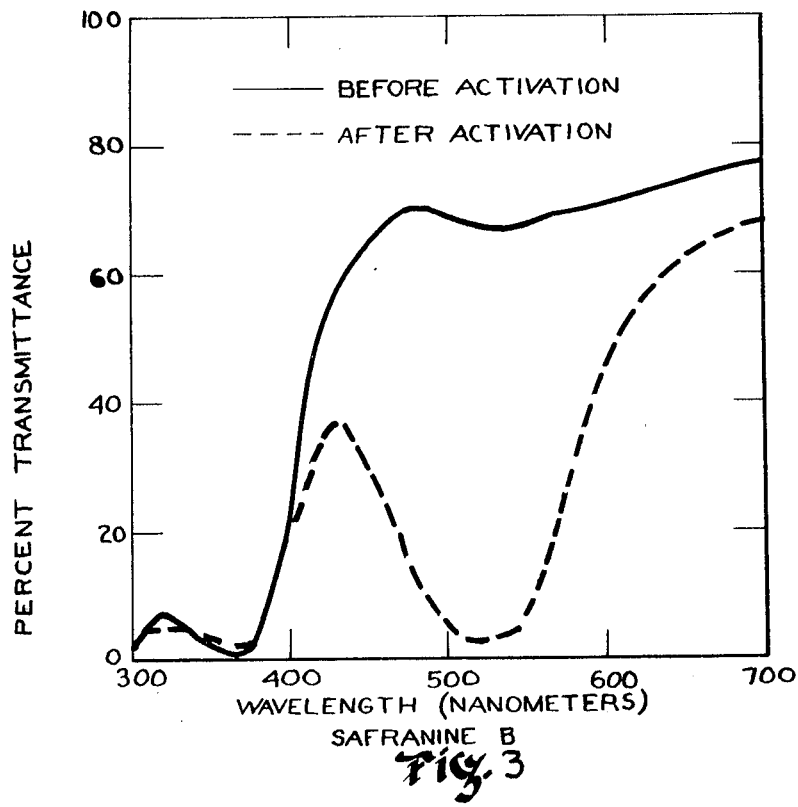
Figure 4:
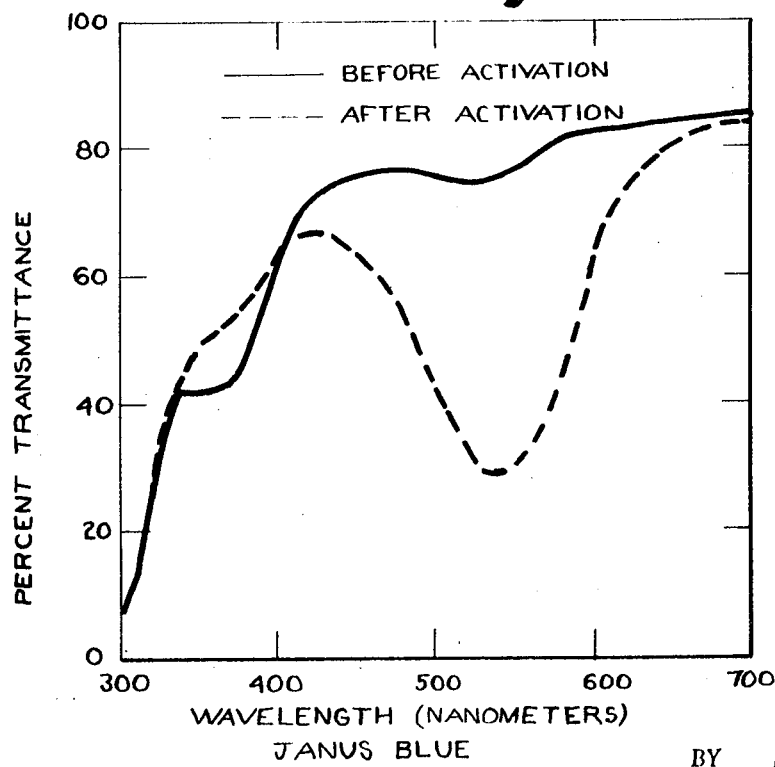
Figure 5:
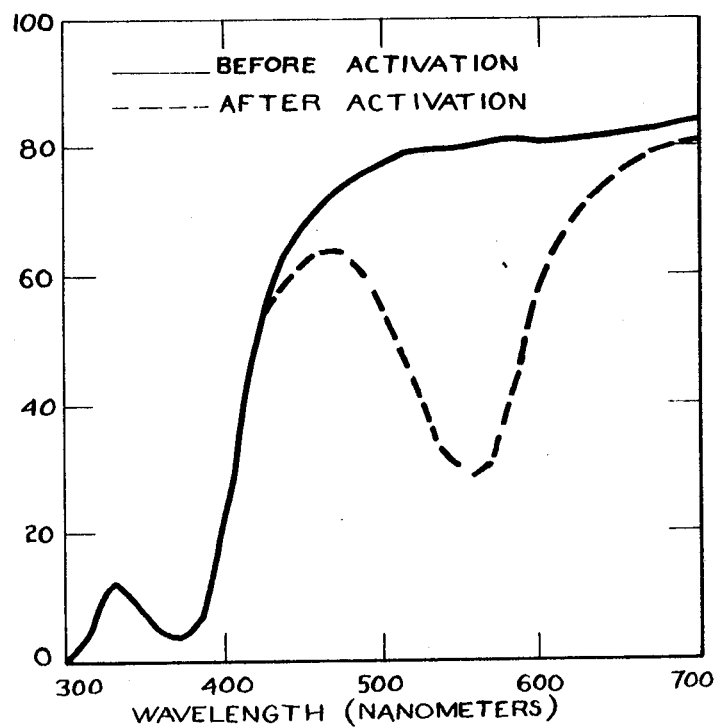
Figure 6:
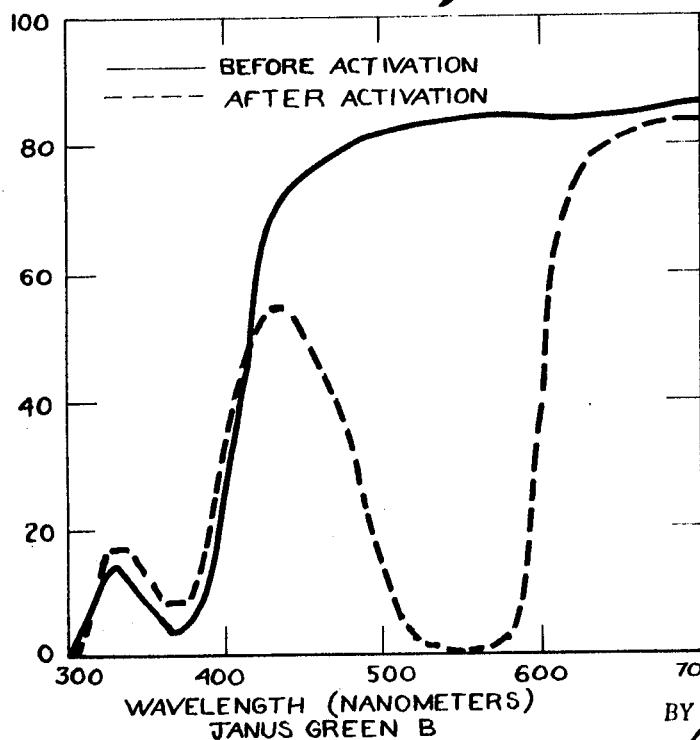
Figure 7:
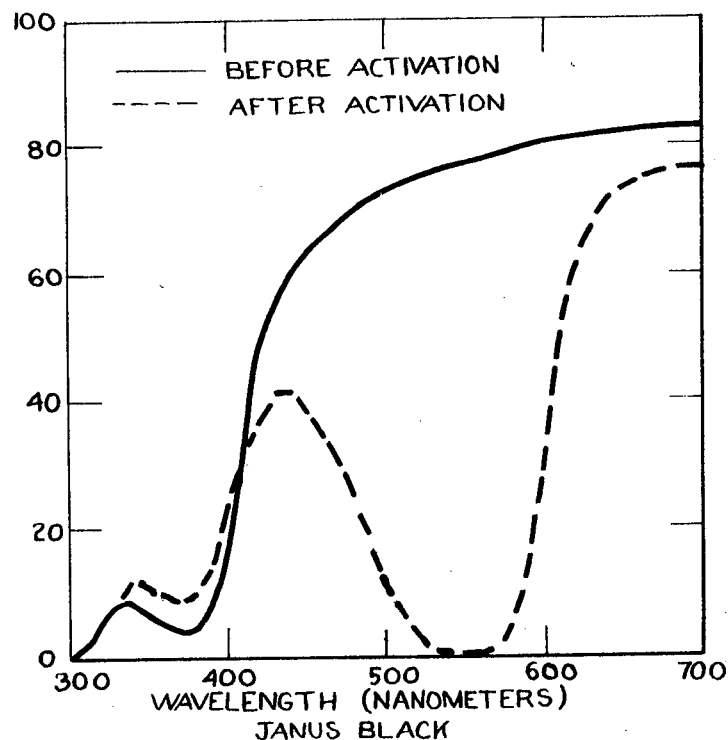
Figure 8:
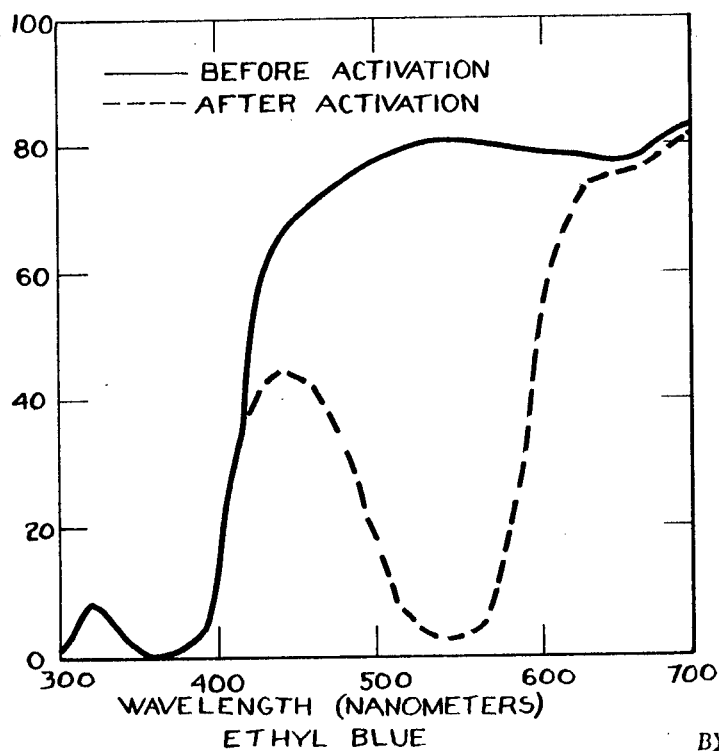
Figure 11:
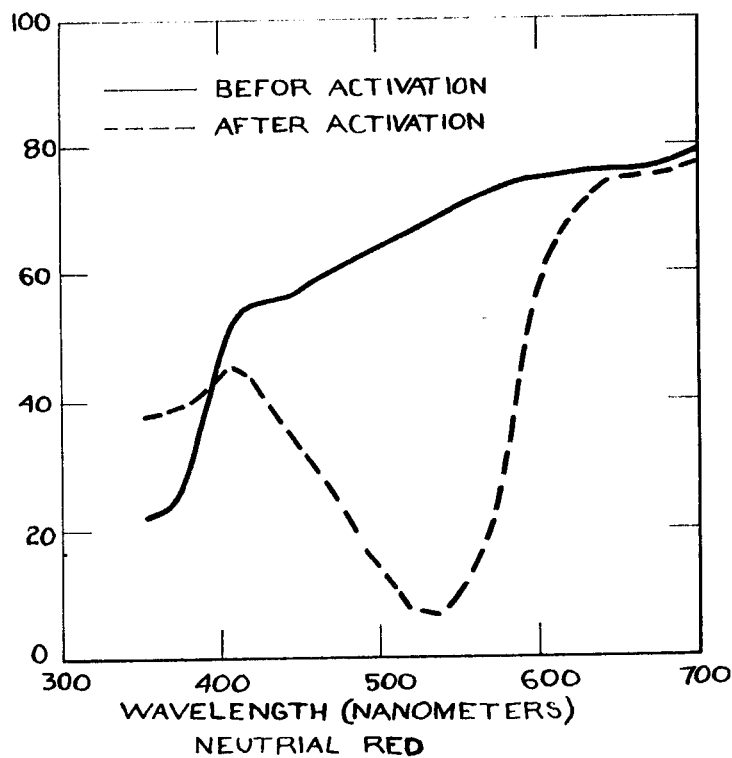
Figure 12:
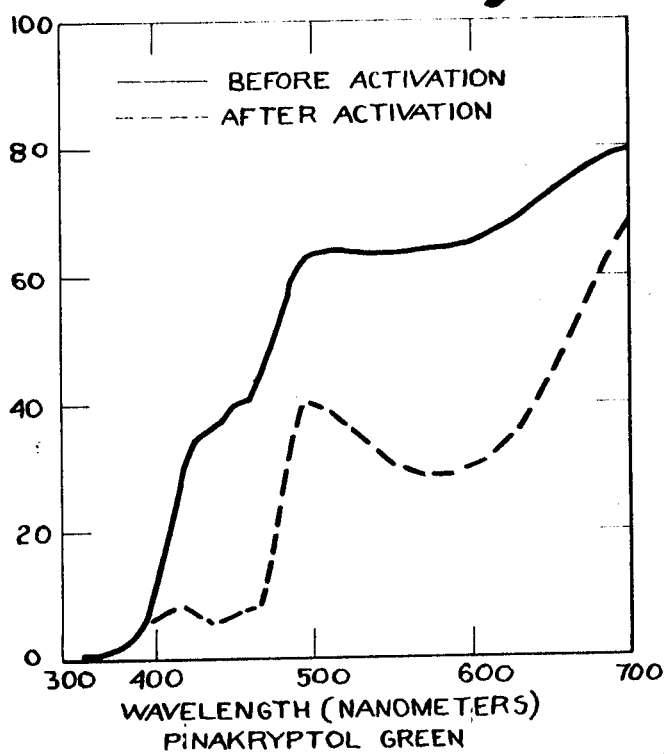

Light filters of variable optical density are known in the art, and such filters are particularly useful for variations in light intensity and makeup, to provide protection against frequent or sudden changes in light intensities. For example, variable density light filters may be employed in protective spectacle lenses or goggles for permitting variation of the optical density of the lens as the wearer moves in and out of different light conditions. One system of variable optical density filters using a photochromic composition is illustrated in my Pat. No. 3,408,134, patented Oct. 29, 1968. In that patent the system comprises a leuco base of a thiazine dye in a solvent with a reversible reducing agent preferably stannous chloride. The present invention utilizes a system of a leuco phenazine dye base with a reversible reducing agent. Leuco phenazine dyes have not been recognized as photochromic, and it has been found that they extend greatly the absorption spectra, and provide in the activated form considerably different colors.

Included among the objects and advantages of the invention is to provide improved variable density light filtering means which includes a composition of a photochromic phenazine dye and a reversible reducing agent, providing filtering means which has a property of automatically varying in optical density in respones to variation in light incident on the filtering means.

Another object of the invention is to provide filtering means in which the variation in optical density is proportional to the variation of the incident light.

It is a further object of the invention to provide a variable density light filtering means which may be substantially completely transparent under selected light conditions and which may acquire substantial light-absorbing properties in response to increasing incident light thereon.

A still further object of the invention is to provide variable density light filtering means which is light, compact, rugged and of inexpensive construction and arranged to be adapted for use as spectacle lenses, eye shields and the like.

These and other objects and advantages of the invention may be ascertained by referring to the following detailed description and the appended drawings in which:

FIGS. 1–12 inclusive are graphs illustrating variations in light-absorbing properties of various phenazine dyes used as light filtering means according to this invention.

In general, the invention is ascertained by forming a solution of a leuco base of a phenazine dye in a suitable solvent with a quantity of reversible reducing agent, such as stannous chloride. The solution is photochromic in that the optical density or light-absorbing properties of the solution is changed in response to variations in the radiation of the solution with light of selective wavelengths. The photochromic compositions are prepared by reacting the dye and reversible reducing agent in an appropriate solvent, such as polar solvents including water, methanol, ethanol, iso-propanol, glycerine and the like. Subsequent treatment with acidified sodium silicate yields semi-rigid photochromic gels which may be incapsulated between thin glass or plastic wall cells or the like. In the unactivated state, all of the leuco phenazine dye systems are colorless, but upon absorption of ultra-violet light develop various colors, depending upon the particular leuco dye. In the absence of activating light, they thermally recover their colorless state. The solutions are made by using the dye in solution at a concentration range of about $1.0 \times 10^{-6}$ M to 0.5 M. The reversible reducing agent may be used in a concentration of about $5.0 \times 10^{-6}$ M to about 1.0 M. A controlling requirement for the reducing agent is that it be completely reversible and that it be soluble in the polar solvent chosen to dissolve the dye. Stannous chloride, titanous chloride and sodium dithionite have been found satisfactory. However, it is not applicant's intent to limit the invention to a specific reducing agent. It is applicant's intent to claim as part of his invention any reducing agent that is completely reversible with the phenazine dye and that is soluble in the same polar solvent as the dye.

For a specific example, dimethylsafranine (3-amino-7-dimethylamino-5-phenylphenazinium chloride) in methanol solution at a concentration of about 0.007 M is reacted with stannous chloride at a concentration of about 0.1 M. The solution is colorless and highly transmissive in a room having generally average artificial illumination. On irradiation by ultra-violet and short wave visible light of substantial intensities, the solution develops a red violet coloration. The transmissive properties of the dimethylsafranine solution before and after activation with ultra-violet light are shown in FIG. 1. The solid lines of the figure show transmittance before activation and the dashed lines after activation. The sample was exposed to irradiation at a spacing of six centimeters for a period of one minute by two fifteen-watt ultra-violet lamps made by the General Electric Company and designated F15T8–BLB lamps. The sample is then returned to the average room illumination for a period of about one hour or more, and the sample returns to its colorless highly transmissive state.

The concentration of the leuco phenazine dye may be extended over a considerable range, as pointed out above, and still provide the photochromic effect. Various phenazine dyes set out below each with its common name, structural formula, and chemical name of the dye, solution made up in accordance with the procedure set out above were tested similarly. The number of the example below corresponds to the figure number showing the absorptive characteristics of the dye solution, and the examples being shown as 1 through 12 corresponding respectively to FIGS. 1 through 12 for the absorption characteristics.

EXAMPLE I

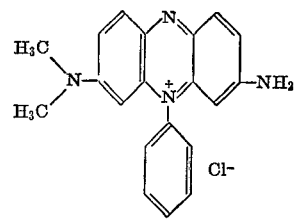

Dimethylsafranine
3-amino-7-dimethylamino-5-phenylphenazinium chloride

EXAMPLE II

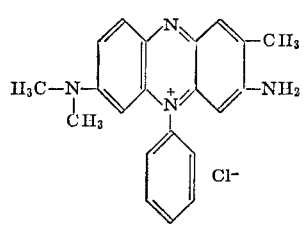

Rhoduline Violet
2-methyl-3-amino-7-dimethylamino-5-phenylphenazinium chloride

EXAMPLE III

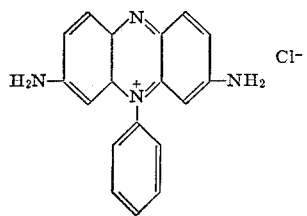

Safranine B
3,7-diamino-5-phenylphenazinium chloride

EXAMPLE IV

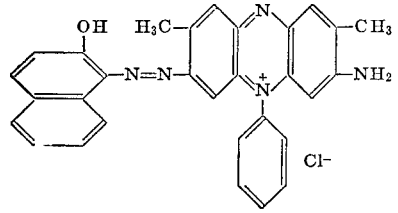

Janus Blue
3-amino-2,8-dimethyl-7-(2-hydroxy-1-naphthylazo)-5-phenylphenazinium chloride

EXAMPLE V

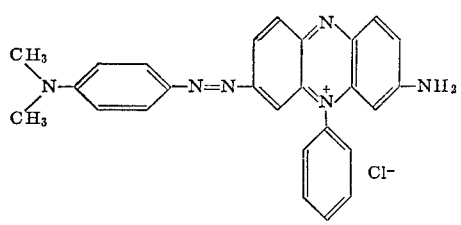

Janus Green
3-amino-7-(p-dimethylaminophenylazo)-5-phenyl-phenazinium chloride

EXAMPLE VI

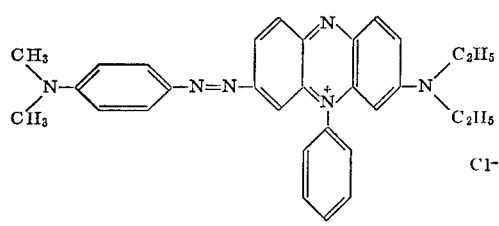

Janus Green B
3-diethylamino-7-(p-dimethylaminophenylazo)-5-phenylphenazinium chloride

EXAMPLE VII

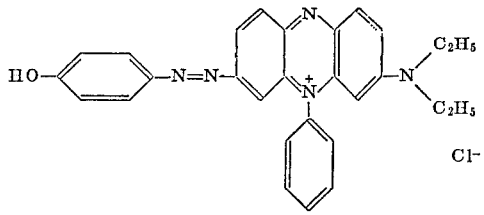

Janus Black
3-diethylamino-7-(p-hydroxyphenylazo)-5-phenylphenazinium chloride

EXAMPLE VIII

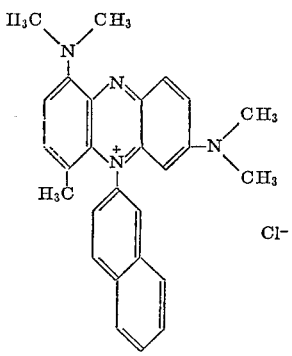

Ethyl Blue
3,9-dimethylamino-6-methyl-5-(2-naphthyl)-phenazinium chloride

EXAMPLE IX

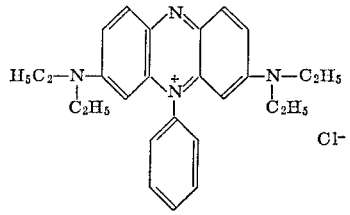

Amethyst Violet
3,7-bis(dimethylamino)-5-phenylphenazinium chloride

EXAMPLE X

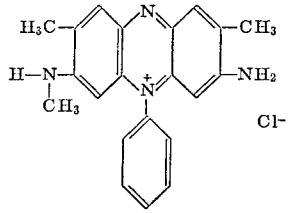

Rhoduline Red
2,8-dimethyl-3-amino-7-methylamino-5-phenylphenazinium chloride

EXAMPLE XI

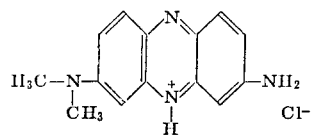

Neutral Red
3-amino-7-dimethylaminophenazinium chloride

EXAMPLE XII

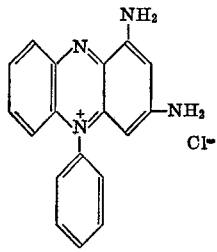

Pinakyrptol Green
1,3-diamino-5-phenylphenazinium chloride

Increasing the concentration of the lueco phenazine dye tends to increase the rate at which the solution will respond to irradiation with ultra-violet light, therefore having increased light-absorbing properties. In a preferred form the photochromic solutions include at least stoichiometric quantities of stannous chloride, or other reversible reducing agent, for assuring that all the dye in solution will properly react with the stannous chloride. An increase in the amount of stannous chloride in solution will increase the rate at which the solution returns to its more transmissive state. For a reasonably rapid rate, the concentration of the stannous chloride in the solution should be at least about 5 times greater than the concentration of the dye in the solution. Further, it has been found that more acidic solutions provide increased rates for returning the dye to the more highly transmissive state.

The variable density light filtering solutions may be prepared with the dye in solvents other than methanol, for example water, ethanol, iso-propanol, glycerine, etc. solution. Various other colorless solvents for the dye and the reversible reducing agent may be used, alone or in combination.

As described in my earlier patent, the reaction which occurs with the photochromic solution is believed to comprise a reversible photo-oxidation process. It is, therefore, important that all atmospheric oxygen be excluded from the chemical system. The solution may be placed in various light-transmissive containers which are airtight.

Phenazine dyes are derivatives of a phenazinium salt of the general formula

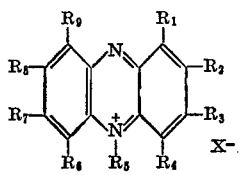

the X represents the negative ion, e.g. halides; $R_1$, $R_2$, $R_3$, $R_4$, $R_5$, $R_6$, $R_7$, $R_8$, and $R_9$ may be hydrogen; short chain alkyl; amino, alkyl amino; azo; substitute azo, usually aryl substituents; etc. The substituents on the phenazinium ion may be 1, 2 or more providing different colors. The $R_5$ substituent is usually aryl, but may be hydrogen, etc. When $R_5$ is phenyl, the class of dyes is known as phenylphenazinium salts, or safranine dyes. The lueco dyes have not heretofore been recognized as photochromic.

It should be understood that particular embodiments of the variable density light filtering means provided by this invention have been described by way of illustration, but the invention includes all modifications equivalent thereof which fall within the scope of the appended claims.

What is claimed is:

1. A variable density light filter means comprising a solution of a reversible reducing agent and a phenazine dye which is a derivative of a phenazinium salt in a polar solvent, the reversible reducing agent being selected from the group consisting of stannous chloride, titanous chloride, and sodium dithionite, said dye being present in a concentration in the range of about $1.0 \times 10^{-6}$ M to 0.5 M, said reducing agent being completely reversible and soluble in the solvent chosen to dissolve the dye.

2. A variable density light filter means comprising a solution of a reversible reducing agent and a phenazine dye which is a derivative of a phenazinium salt in a polar solvent, said polar solvent being selected from the group consisting essentially of water, methanol, ethanol, iso-propanol, and glycerine, the phenazine dye being selected from the group consisting of dimethylsafranine, Rhoduline violet, Safranine B, Janus blue, Janus green, Janus green B, Janus black, ethyl blue, amethyst violet, Rhoduline red, neutral red, and pinakyrptol green, the reversible reducing agent being selected from the group consisting of stannous chloride, titanous chloride, and sodium dithionite, said dye being present in concentration in the range of about $1.0 \times 10^{-6}$ M to 0.5 M, said reducing agent being completely reversible and soluble in the solvent chosen to dissolve the dye.

References Cited

UNITED STATES PATENTS 3,408,134 10/1968 Hovey _____ 252—300

OTHER REFERENCES

Wahl, Organic Dyestuffs, 1914, pp. 254–257.

GEORGE F. LESMES, Primary Examiner

J. P. BRAMMER, Assistant Examiner

U.S. Cl. X.R.

350—3, 160